May 4, 1965　　　　　　　　　E. DASH　　　　　　　　　3,182,173
WELDING STUD AND FERRULE CONSTRUCTION FOR ARC WELDING
Filed May 21, 1962　　　　　　　　　　　　　　　　2 Sheets-Sheet 1
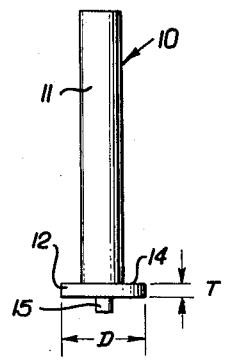
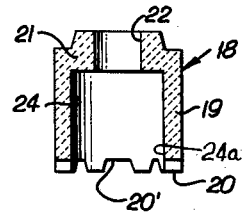
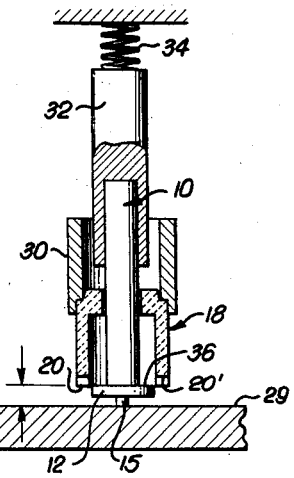
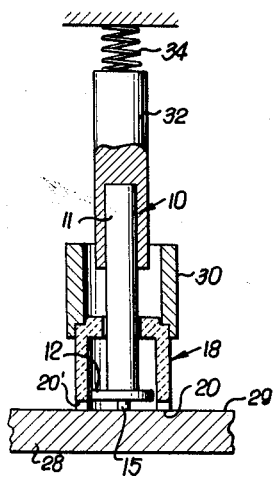
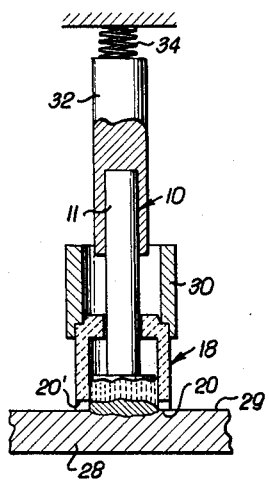
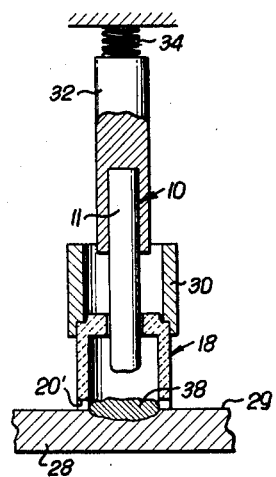
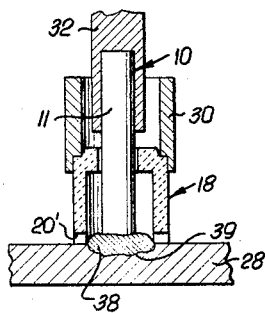
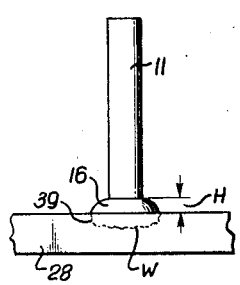
EDWARD DASH
INVENTOR.
BY *Miketta and Glenny*
ATTORNEYS.

May 4, 1965  E. DASH  3,182,173
WELDING STUD AND FERRULE CONSTRUCTION FOR ARC WELDING
Filed May 21, 1962  2 Sheets-Sheet 2

EDWARD DASH
INVENTOR.

BY Miketta and Glenny
ATTORNEYS.

United States Patent Office 3,182,173
Patented May 4, 1965

3,182,173
WELDING STUD AND FERRULE CONSTRUCTION FOR ARC WELDING
Edward Dash, 710 W. Columbia St., Long Beach 6, Calif.
Filed May 21, 1962, Ser. No. 196,380
10 Claims. (Cl. 219—99)

This invention relates to a welding stud and ferrule construction for use in electric arc stud welding and more particularly to a welding stud provided with an enlarged head thereon and a refractory sleeve or ferrule cooperable therewith during electric arc welding so as to produce virtually symmetrical fillets and sound welds when welding a stud in any position, especially to horizontal or vertically disposed surfaces of a work member.

The present invention contemplates an inexpensively manufactured welding stud. Prior proposed studs have included a welding end with a projection tip of reduced section; Patents 2,644,068 and 3,004,139. A secondary production operation was necessary to produce such a tip portion on the stud welding end. The present invention contemplates a stud construction having a shank portion with welding head means including an enlarged head portion and a reduced tip portion which may be readily manufactured as by a cold heading or upsetting process, the formation of the head and tip being accomplished in one production operation, or in one machine such as a boltmaker machine.

The invention also contemplates combining such a headed stud with a selected ferrule construction so as to produce substantially symmetrical fillet formation during arc welding operation. Substantially symmetrical fillet formations are shown in FIG. 54.14, page 54.17 of Section 3 of the 4th Edition of the Welding Handbook published by the American Welding Society. When welding is done on a flat horizontal surface with the welding end of the stud directed downwardly, symmetrical fillets are generally readily obtained. However, when welding a stud to a vertical surface on a work member, it is difficult to produce a stud weld with a symmetrical fillet because of the effect of gravity upon the molten metal. The present invention employs a combination stud and ferrule so related to each other that symmetrical fillets are readily and consistently obtained when welding a stud to such surfaces on a work member.

The combination stud and ferrule of the present invention also has utility in connection with welding studs to thin gauge sheet metal. Welding to thin gauge sheet metal presents burn-through problems and while this problem is solved by the metal faced ferrule of my Patent 2,950,379, the present invention contemplates a solution to this problem by relating an untipped enlarged head of a stud to the ferrule construction as hereafter described.

Prior proposed headed studs have been employed in stud welding (note Patents 1,359,620; 2,265,169). However, such prior proposed headed studs were not employed with a ferrule and usually welds with such studs resulted in only superficial bonding of the head to the work metal. In prior resistance and in percussion welding of studs without the use of ferrules the head portion of the prior proposed studs remained intact and was only slightly or partially melted. Fillet formation was non-existent and the weld took place exclusively between the peripheral edge of the head and the work metal.

The present invention contemplates a combination stud and ferrule for welding studs to work members of either thick or thin section and in which the resultant weld includes virtually complete melting of an enlarged headed end of the stud and the formation of a substantially uniform fillet around the adjacent shank portion of the stud. The invention contemplates that during the welding operation the metal which provides the fillet is laterally displaced a minimum or zero distance within the ferrule upon the plunging of the stud into the molten metal formed by the welding arc. The present invention contemplates that the entire enlarged head be melted and that the fillet metal originates principally from the metal which defines the enlarged peripheral marginal or flange portions of the stud and that such metal is directly deposited upon the work surface and located without (or with only a minimum of) lateral displacement of molten metal within the ferrule with respect to the axis of the stud.

The primary object of this invention therefore is to provide a stud-ferrule combination which results in substantially uniform symmetrical fillets and sound welds.

Another object of the invention is to disclose and provide a stud-ferrule combination wherein a headed welding stud is employed and wherein the entire head of the stud is melted during the welding operation to provide a stud weld with substantially uniform fillet formation whether the work surface is horizontal, vertical or otherwise positioned.

Another object of the invention is to disclose and provide a welding stud which is economical and inexpensive to manufacture and which may be produced by a single production operation.

A further object of the invention is to disclose and provide a novel stud-ferrule combination adapted for use on thin gauge plain or galvanized metal to provide reliable stud welds without burn-through and with virtually uniform fillets.

Generally speaking, a stud-ferrule combination embodying this invention includes a stud having a radially enlarged head means of selected cross-sectional area and thickness and a ferrule chamber of almost corresponding cross-sectional area to receive said head means, whereby metal forming the fillet is directly deposited from the enlarged head and placed on the work surface without lateral displacement of molten metal thereto when the stud is plunged into the molten pool to form the stud weld.

Various other objects and advantages of the present invention will be readily apparent from the following description of the drawings in which exemplary embodiments of this invention are shown.

In the drawings:

FIG. 1 is a side elevation of a welding stud embodying this invention.

FIG. 2 is a sectional view taken in a plane passing through the axis of a refractory ferrule for use with the stud of FIG. 1.

FIG. 2a is a sectional view taken in a plane passing through the axis of a modified ferrule adapted for use with the stud of FIG. 1.

FIG. 3a is a side elevational view partly in section, the section being taken in a plane passing through the axis of the stud and ferrule in assembled relation with a work piece and with a schematically shown stud gun showing the first step in a welding process employing the stud and ferrule of FIGS. 1 and 2.

FIG. 3b is a view similar to FIG. 3a but shows the ferrule positioned on the work piece.

FIG. 3c shows drawing of the arc, retraction of the stud, and deposit of metal from the head on the work piece.

FIG. 3d shows the stud-ferrule at the end of the arcing process.

FIG. 3e shows the stud-ferrule after the stud had been plunged into the molten metal confined by the ferrule.

FIG. 3f shows a completed stud weld, with the ferrule removed.

Figure 4:
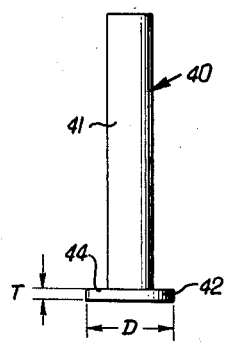
FIG. 4 is a side elevation of a headed stud embodying a modification of the invention.

In the embodiment of the invention shown in FIGS. 1–3 inclusive, a welding stud 10 may comprise a shank portion 11 of plain cylindrical form. Shank portion 11 may be of any cross-sectional configuration, may be provided with threads or other fastening devices, and may be varied in shape and configuration along its length depending upon the purpose for which it is intended. Shank portion 11 at one end, is provided with an enlarged head means 12 having a selected thickness T and a selected diameter D greater than the diameter of the shank portion 11 forming a peripheral flange section 14.

A projection or tip 15 may extend from the bottom surface of head means 12 and may be of reduced cylindrical cross-sectional configuration and of a predetermined length. Preferably the tip is coaxial with shank portion 11. The head means 12 including tip 15 may be produced by a cold heading or upsetting process in a single operation and it will be readily apparent that a headed stud such as stud 10 may be inexpensively, rapidly, and simply manufactured. In another modification of the stud there may be two or more tips equally spaced on the head, which may facilitate in some machines the manufacture of the stud.

In the present example, the thickness T of the head means 12 may be relatively small, and may be approximately equal to the ultimate average height H of the fillet weld 16 (FIG. 3f). The thickness T of the head 12 is related to the size of the shank 11. For a ½" diameter stud, for example, the thickness T of the head 12 may be approximately 3/32". The projection tip (or tips) is preferably of a volume of metal which is approximately 10% or less of the total weld metal to be deposited during a welding operation, the total deposited weld metal comprising tip 15 and head means 12. It is understood that the tip 15 and/or head means 12 may be coated with or contain flux material, if considered desirable, for various purposes.

Ferrule 18 may be made of any suitable refractory material well known in the art. The ferrule 18 may comprise a cylindrical wall 19 having an end face 20 with vent openings 20', end face 20 being adapted to seat upon the surface of a work member. The top portion 21 of ferrule 18 is provided with a coaxial opening 22 substantially larger than shank portion 11 so that the latter can pass freely or loosely through opening 22. The cylindrical wall 19 defines a ferrule chamber 24 having a diameter or cross-sectional area approximately the same as that of the enlarged head means 12, and with just sufficient clearance to permit head means 12 to pass freely into the welding chamber through the opening defined by edge face 20 (FIG. 3b). Clearance between the head means 12 and the ferrule chamber 24 is held to a minimum consistent with good practice for a free sliding or movable clearance so that movement of stud 10 with respect to the ferrule will not be restrained or restricted.

It will be understood that various and different shapes of head means and types of ferrules may be used as long as the enlarged head means 12 is substantially the same configuration and area as ferrule chamber opening 24a, and provides small clearance between the periphery of head means 12 and the internal wall surface of the ferrule. In other words, ferrule 18 may simply be an elongated, hollow cylinder of uniform diameter with the opening 24a of the same diameter as the coaxial opening 22. The ferrule 18 may be provided with auxiliary vents in the wall 19, or as shown in FIG. 2a internal longitudinal grooves 25 in wall 19' so as to allow exit of gases through the wall or along the grooves 25 out through opening 22'. In some instances auxiliary vents are not required, and the venting of gases may take place exclusively through opening 22 as in my prior Patent 3,004,139.

The cooperative relationship of stud 10 and ferrule 18 are shown in FIGS. 3a–3f inclusive and illustrate sequential steps of welding with such a stud ferrule combination. A work member 28 has a surface 29 to which stud 10 is to be welded. The stud 10 may be held by a stud holder or chuck 32 of well-known construction, and normally biased toward the work member 28, as diagrammatically indicated by a gun spring 34. Ferrule 18 may be held by a ferrule holder 30 of well-known construction and associated with a stud welding gun not shown.

At the beginning of a welding operation, a stud gun is held generally perpendicular to work surface 29 so that the stud 10 will have its axis disposed normal to the surface. The spring means 34 biases the stud forwardly and the end face of the tip 15 is seated against work surface 29. Adjustment is then made of the plunge distance P by well-known means so that the edge face 20 of the ferrule 18 lies in approximately the same plane as the top annular surface 36 on the enlarged head means 12. The operator then presses or pushes the gun toward work member 28, compressing gun spring 34, and causing the edge face 20 of the ferrule to seat or rest squarely on work surface 29. The amount of compression of the spring is equal to plunge distance P.

Welding current is then caused to flow through stud holder 32, stud 10, and work member 28 by well-known means used in arc stud welding processes. The stud holder is retracted by the gun mechanism and an arc is initially established between the end face of tip 15 and surface 29. As arcing continues, the metal of tip 15 is first melted and is deposited upon surface 29. Arcing continues after tip 15 is melted and the arc spreads over the entire surface of the head means 12 (FIG. 3c) and the metal of the enlarged head means 12 is completely melted and deposited upon the work surface within the confines of the ferrule cylindrical wall 19. The flow of melted metal from the head 12 normally follows the arc path. It will therefore be readily apparent that the metal of flange section 14 is deposited upon work surface 29 immediately adjacent to the internal surface of ferrule wall 19 at the opening 24a and at the location of the ultimate fillet metal. When the entire head 12 has been melted, the molten metal is deposited as a pool within the confines of the ferrule chamber and a substantially deep portion of the metal of the work member has also been melted (FIG. 3d). The welding current is then interrupted by well-known timing means and spring means 34 then propels stud 10 forwardly into the molten pool of metal 38 and a weld is formed as shown in FIG. 3e and FIG. 3f. The fillet 16 has a diameter corresponding to the diameter of the welding chamber and substantial penetration of the work member is provided as indicated by the dotted lines 39 indicating the heat affected zone in the metal of the work member.

In the combination stud ferrule of the present invention, it has been found that thickness T of head means 12 is important. When the thickness is too great, only part of the head thickness can be melted. Sound welds can be made where ferrule opening 24a is related to the shank portion of the stud as described in my Patent 3,004,139, in which the opening should be at least 1.2 times larger than the welding end of the stud. In the present invention, this ratio does not pertain and has been reduced to a factor of almost unity since head means 12 has a diameter almost the same as that of opening 24a.

It is important to note that the head means 12 including tip 15 is completely melted and transformed into the weld metal indicated at 38. Since the diameter of head means 12 is substantially the same as the diameter of the ferrule chamber, the outer diameter of the fillet obtained is approximately that of the head diameter. The height of the fillet also substantially corresponds to the initial thickness of flange section 14 of head means 12. In general, the volume of the fillet 16 is approximately equal to the volume of head 12.

It will be readily apparent to those skilled in the art that since the cross-sectional area of head means 12 is virtually that of the weld chamber, weld metal deposited from the head to the work surface is immediately and directly placed where it will ultimately remain after solidification. Thus such weld metal is not laterally displaced from the general position of the stud shank to the outermost portion of the weld chamber in the ferrule as when welding with a stud not having an enlarged head, such lateral displacement being actually considerable. It is thus clear that in position welding, as in welding a stud to a vertical surface, it is of great advantage to have the welding arc located so that molten weld metal from the stud does not have to travel upwardly in opposition to gravitational forces but rather to have the weld metal correctly located and deposited during the arcing action and to remain virtually undisturbed during plunging of the stud into molten weld metal upon completion of the welding operation. As a result, stud welds made to a vertical surface with the stud-ferrule construction of the present invention, result in symmetrical fillet welds.

It should also be noted that since the head means 12 at its flange section 14 is relatively thin, the metal of the head during a welding operation becomes molten more readily and quickly as compared to the melting of a solid stud shank in the usual stud. As a result of such thin flange section 14 when the stud-ferrule combination of the present invention is used, lower energy values may be used to obtain sound welds.

It should be noted that, during the welding operation, the flange section 14 melts quite rapidly because of the thinness of the section. The gases which form between the head and the work surface are vented out through openings in the wall 19 or through the vents 20'. The gases may also be vented through auxiliary vertical grooves 25 in the chamber wall 19' and out through opening 22', such vertical grooves forming passageways while the head 12 is being melted.

In FIGS. 4 and 5a–5d inclusive, a modification of a welding stud and ferrule combination embodying this invention is shown in relation to welding a stud on a metal sheet or thin section metal. The welding stud 40 differs from stud 10 in that a projection or tip 15 is not provided at the enlarged head 42. The enlarged head 42 is provided with a thickness T', a selected diameter D', and defines with shank portion 41, a radially outwardly projecting flange section 44.

The ferrule 48 is constructed similarly to ferrule 18 of the prior embodiment and is shown with the vents 50'. As in the prior embodiment such vents are not necessarily required and edge face 50 may rest squarely on work piece 58 without such vents 50'. Ferrule 48 is dimensionally related to the enlarged head 42 of stud 40 in substantially the same manner as described in the prior embodiment. The ferrule chamber 54 and head 42 have only sufficient clearance for relative free movement therebetween.

Figure 5A:
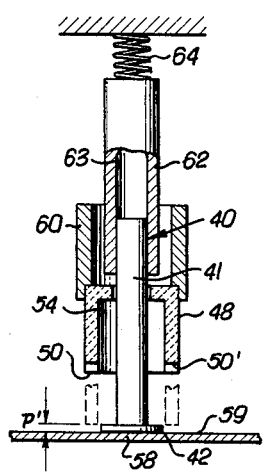
FIGS. 5a, 5b, 5c, 5d and 5e are elevational views partly in section, the sections being taken in a plane passing through the axis of stud-ferrule combinations and show successive steps of welding such a headed stud of FIG. 4 to a thin gauge metal sheet.
Figure 5B:
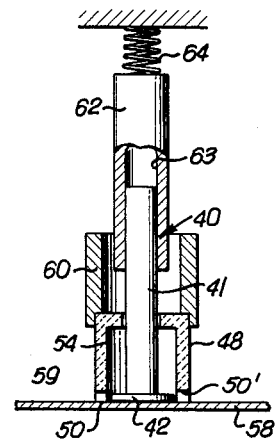

FIGS. 5a–5d inclusive, illustrate the several steps of welding such a stud 40 to a thin section work member 58 utilizing a stud gun as in FIGS. 1–3 and employing a plunge distance P' (FIG. 5a) or employing a zero distance (FIG. 5b). When commencing a stud welding operation using a plunge distance P', the stud 40 may be carried by a stud holder or chuck 62 in the same manner as described in the prior embodiment and the ferrule 48 may be held by a ferrule holder 60 in similar manner.

An operator may position the bottom face of the head 42 against work piece 58 and on the work surface 59. The plunge distance P' may then be selected by moving edge face 50 of the ferrule toward the work surface until the plane of the face 50 is at approximately that of the top surface of enlarged head 12.

The remaining steps of the stud welding process are substantially the same as those described in the prior embodiment, namely: ferrule 48 is seated on work surface 59, the stud retracted and a welding arc drawn and distributed over the entire area of the head 42 until the entire head is melted, the molten metal from the head deposited over the opposed area of the surface 59 and confined within the ferrule wall 39, and the shank portion adjacent the head plunged into the molten metal. Since no tip is used there is no initial concentration of a welding arc at a small area. Instead, the arc is spread over the bottom face of the head and such distribution of the arc prevents burn through of the thin metal section of work member 58. As before, the fillet formed is substantially the same thickness and diameter as the flange section 44 of the enlarged head 12.

When the plunge adjustment is zero, a stud holder 62 having a long bore 63 without a stop and approximately equal to the shank diameter of the stud 40 may be employed. The zero plunge may also be obtained with a stud holder of the prior embodiment with a stop by positioning the ferrule 48 so that its edge face 50 is in the same plane as the lower surface of the enlarged head 42.

As the operator moves stud gun 62 and ferrule holder 60 towards a work surface, the stud shank portion 41 may slide up the stud holder bore 63 until the bottom face of the head 42 is in the same plane as edge face 50 of ferrule 48 as shown in FIG. 5b. There is no compression of the gun spring means 64 at this time and this adjustment is equivalent to a zero plunge.

Figure 5C:
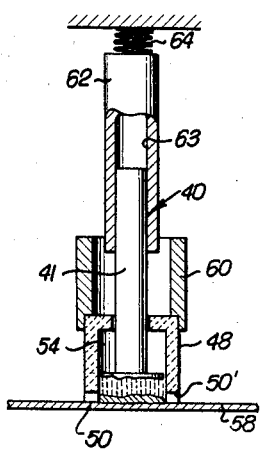
Figure 5D:
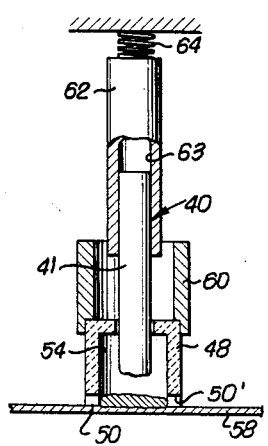
Figure 5E:
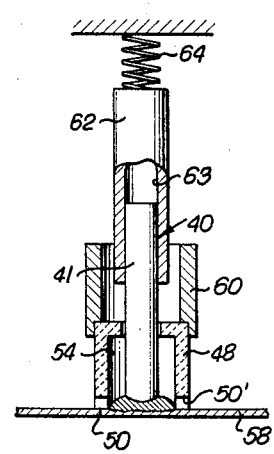
Figure 5F:
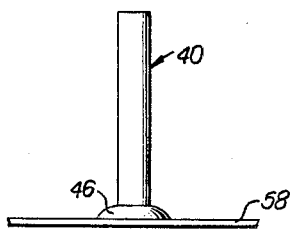
FIG. 5f shows the completed weld with the ferrule removed.

When welding current is caused to flow through stud holder 62, the stud 40 and work member 58 by well-known means, the stud holder 62 closely slidably grips the stud so that arcing does not occur between the stud holder and the stud while at the same time the shank portion 41 may slide in bore 63 yet not fall out because of gravity. When the stud holder 62 is retracted by the stud gun, spring means 64 is compressed and an arc is established between the entire bottom face of the enlarged head 42 and the work member. The enlarged head begins to melt at the bottom face thereof and molten metal is deposited on the surface of the work member as indicated at 58 (FIG. 5c). When head 42 is substantially melted, the welding current is interrupted, and the shank portion of the stud is propelled into the molten pool of metal to form the weld 46 (FIG. 5f).

It is important to note that there is no reduction in cross-section at the junction of the fillet weld and shank portion. When a zero plunge is attempted with a conventional stud, a reduction in cross-section occurs at such junction and the weld is seriously weakened.

Burn through of the thin section sheet metal is prevented because weld metal from the enlarged head is distributed over a relatively wide area and the amount of heat per unit area is reduced and the temperature at any point in the weld area is low. Thus a low amount of energy is required for stud welding and ferrules may be reused.

It will be apparent that the close relationship between the stud with its enlarged head and the ferrule provides a construction for consistently producing sound welds with uniform symmetrical fillets in position welding.

In addition, it is important to note that since the welding arc is formed over the entire bottom surface area of head means 12 including peripheral flange section 14, the opposed metal of the work member is subjected to melting over at least a corresponding area. Thus, substantial heating and melting of metal at the periphery of the ultimately formed fillet is provided in the work member and results in a stronger, sound weld. The pattern or configuration of the depth or penetration of the weld metal is indicated at W, FIG. 3f. Such pattern is generally rectangular (in vertical section) rather than generally semi-circular as in prior welds known to me and wherein the deepest penetration is at the prolongation of the stud axis and only little or superficial penetration occurs at the periphery of the fillet metal.

In the above described stud-ferrule combination, modifications and changes thereto which come within the spirit of this invention and within the scope of the appended claims are embraced thereby.

I claim:

1. A stud-ferrule combination for electrically arc welding a stud to a work member comprising: a stud having a shank portion and an enlarged head portion including a peripheral flange section of substantially uniform thickness extending radially outwardly from the shank portion; a ferrule having a chamber provided with an opening at one end receiving said flange section with only minimum free clearance therefor, said chamber having an opening at its other end for receiving said shank portion with loose clearance, whereby said enlarged head portion during a welding operation is confined within said chamber and all of the metal in said flange section is deposited upon the work surface in direct opposition thereto to provide molten fillet metal.

2. A stud-ferrule combination as stated in claim 1 wherein said enlarged head portion includes at least one tip portion extending therefrom, said tip portion having a volume of metal approximately 10 percent or less of the total weld metal deposited in a welding operation.

3. A stud-ferrule combination as stated in claim 1 wherein said flange section extending from said shank portion has substantially the same volume as that of the fillet metal deposited during the welding operation.

4. A stud-ferrule combination for electrically arc welding a stud to a work member comprising: a stud having a shank portion and enlarged head means at one end thereof, said head means having a selected thickness and a cross-sectional area substantially greater than the cross-sectional area of the shank portion; a ferrule having a welding chamber having an opening at one end corresponding in cross-sectional area to the cross-sectional area of the enlarged head means and slightly smaller in cross-sectional area to permit free sliding clearance of the enlarged head means within the ferrule chamber opening, said shank portion having a cross-sectional area and said ferrule chamber having an opening at its other end corresponding to the cross-sectional area of the shank portion and having loose clearance for said shank portion therein, said enlarged head means when withdrawn within said ferrule chamber substantially closing said chamber opening, said ferrule having a plain end face whereby said enlarged head means and said ferrule chamber initially confine welding gases, said ferrule having internal vertical grooves for release of said gases through said loose opening.

5. The combination as stated in claim 4 wherein said enlarged head means includes a projection tip.

6. A stud-ferrule combination for welding a stud to a work member and forming a virtually uniform fillet about said stud comprising: a stud having a shank portion, an enlarged head portion including a flange section having a peripheral edge face, and a tip portion extending from the head portion; a ferrule having a bore receiving at one end said enlarged head portion with only movable clearance between said edge face and said bore, said ferrule having an opening at the other end loosely receiving said shank portion, said enlarged head portion being confined within said bore during a welding operation and said flange section providing essentially molten metal for forming a fillet by direct transfer of said metal to the opposed area of the work surface.

7. A stud-ferrule combination comprising a stud having a laterally enlarged head portion with a peripheral edge face, and a ferrule having a chamber for receiving said head portion under conditions of only just free sliding clearance between said edge face and said chamber.

8. In combination with a method of stud welding including the steps of positioning a headed stud with a peripheral head edge face within a ferrule chamber having just free sliding clerance with said edge face and seating the stud and ferrule on a work piece, drawing an arc over the entire area of the headed stud to form a pool of molten metal, and plunging the stud into the molten metal pool, the steps of:

melting the entire head of the stud and depositing the melted metal upon the area of the work member directly opposite thereto, and confining said molten metal with virtually no lateral displacement whereby metal at peripheral margins of the headed stud becomes metal forming a fillet around the base of the stud.

9. In combination with a method of stud welding including the steps of positioning a stud with a flange at its welding end portion in a ferrule chamber having minimum free clearance with said flange, and seating the stud and ferrule on a work piece, drawing an arc over the entire area of the welding end portion of the stud including the flange to form a pool of molten metal, and plunging the stud into the molten metal pool, the steps of:

melting all of the metal of the flange and positioning said melted metal at the surface of the work member with a minimum of lateral displacement to provide weld metal forming a fillet for the stud.

10. In a method of stud welding employing a stud having a peripheral flange at its welding end portion and a ferrule having a ferrule chamber having just free sliding clearance with said flange, including the steps of:

positioning the bottom face of said ferrule in approximately the same plane as the top face of the flange of a stud when the stud is placed in contact with a work member;

moving the ferrule into seating contact with the work member to determine the plunge distance of the stud;

retracting the stud to draw an arc over the entire welding end portion of the stud including the peripheral flange;

melting the welding end portion including all of the peripheral flange for directly depositing metal from the flange upon the opposed area of the work member by displacement of molten metal in virtually only an axial direction;

and plunging the stud into the molten metal of the welding end portion and the opposed portion of the work member;

and confining said molten metal within said ferrule chamber whereby the melted metal of the peripheral flange forms the fillet around the stud with virtually no lateral displacement of molten metal.

References Cited by the Examiner

UNITED STATES PATENTS

| 1,982,098 | 11/34 | Hartmann | 219—98 X |
| 2,231,480 | 2/41 | Pilger | 219—99 X |
| 2,491,479 | 12/49 | Dash | 219—98 |
| 2,896,065 | 7/59 | Murdock et al. | 219—99 |
| 3,047,711 | 7/62 | Graham | 219—99 |

FOREIGN PATENTS 668,402  3/52  Great Britain.

RICHARD M. WOOD, *Primary Examiner.*